United States Patent [19]
Looker

[11] 4,182,171
[45] Jan. 8, 1980

[54] NAVIGATION DEVICE FOR AIRCRAFT NAVIGATION

[76] Inventor: Ivan L. Looker, 300 E. Sheridan St., Watseka, Ill. 60970

[21] Appl. No.: 892,956

[22] Filed: Apr. 3, 1978

[51] Int. Cl.² ............................................. G01S 5/08
[52] U.S. Cl. ................................. 73/178 R; 116/209; 340/27 NA
[58] Field of Search ................. 73/178 R; 116/124 R, 116/133, 135; 343/106 R, 112 PT; 33/324, 316, 1 CC; 340/27 NA

[56] References Cited
U.S. PATENT DOCUMENTS

| | | | |
|---|---|---|---|
| 2,364,731 | 12/1944 | Luck | 343/112 PT |
| 2,870,735 | 1/1959 | Hunt | 116/133 |
| 2,998,600 | 8/1961 | Majendie | 340/27 NA |
| 3,277,484 | 10/1966 | Bostwick | 343/112 PT |
| 3,460,146 | 8/1969 | White | 73/178 R |
| 3,633,534 | 1/1972 | Hersey | 73/178 R |

Primary Examiner—S. Clement Swisher
Assistant Examiner—Denis E. Corr
Attorney, Agent, or Firm—Hill, Van Santen, Steadman, Chiara & Simpson

[57] ABSTRACT

An aircraft navigation display which allows a pilot to easily envision his position, heading, wind drift and direction of travel relative to one or more radio stations. The presentation allows the pilot to quickly and easily understand and interpret the various indicia because the display is similar to a map and shows the aircraft's plan position and allows the pilot to fly holding patterns as well as cross country patterns since the position of the aircraft is continuously observable.

11 Claims, 3 Drawing Figures

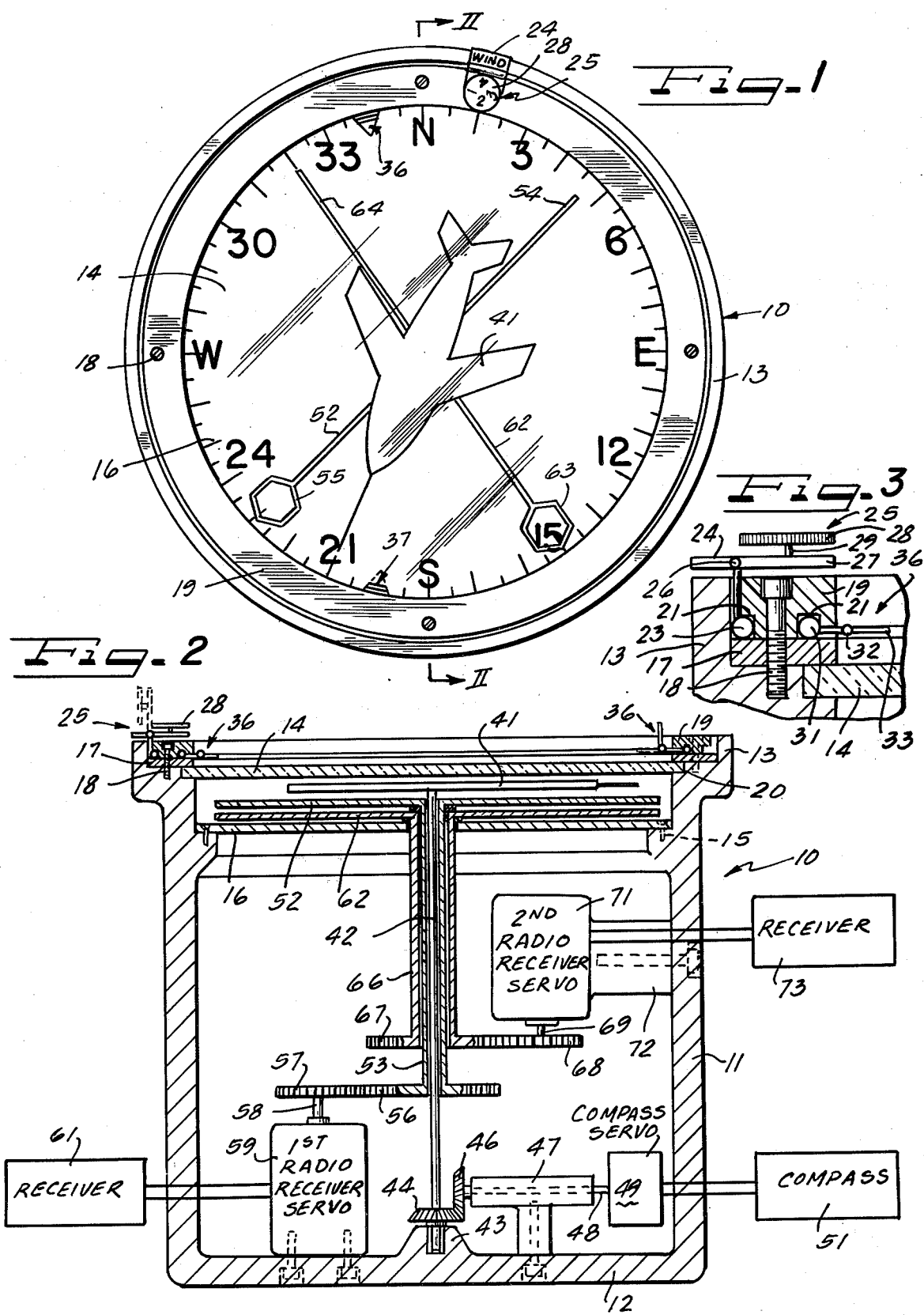

NAVIGATION DEVICE FOR AIRCRAFT NAVIGATION

BACKGROUND OF THE INVENTION

1. Field of the Invention

This invention relates in general to aircraft navigation display systems and in particular to a novel display apparatus.

2. Description of the Prior Art

Prior art aircraft display systems have given rise to ambiguity and interpretation by the pilot which is time consuming and can lead to errors of interpretation and judgment due to the interpretation.

SUMMARY OF THE INVENTION

The present invention provides a novel aircraft radio navigation display which includes a fixed circular compass rose mounted on the instrument panel and provided with a movable aircraft indicia that rotates about the center of the compass rose and is driven by a suitable compass to continuously indicate the heading of the aircraft relative to the compass rose. Rotatable relative to the compass rose are one or more arrow indicia which are driven by one or more radio receivers so as to continuously indicate the aircraft's position relative to the radio stations. One end of each arrow indicates the direction from the radio station to the aircraft and the other end indicates the direction from the aircraft to the radio station. Thus since with the use of the two radio stations the arrows will cross at the center of the instrument and indicate to the pilot the location of the aircraft since the aircraft's position relative to the two stations is known. Each station's symbol can be color keyed to its receiver or the frequency of the station which can be displayed within the radio station symbol associated with the arrow indicia. The shape of the symbol can indicate the type of station.

DME information if available may also be displayed next to the station symbol to aid the pilot's navigation.

Mounted around the perimeter and movable relative to the compass card is manually movable index which indicates the direction and velocity of the wind. This can be manually set by the pilot to the best information available as to the wind velocity and direction or could alternatively be automatically driven by a suitable wind direction and velocity computer.

One or more manually movable reference points are mounted and are movable about the edge of the instrument and can be set by the pilot to known reference points such as to illustrate a check point ahead of the airplane or to indicate when the pilot is to turn on an inbound leg on a holding pattern for example. The display of the invention comprises a simple and novel indicator which makes it very simple for the pilot to navigate the aircraft.

Other objects, features and advantages of the invention will be readily apparent from the following description of certain preferred embodiments thereof taken in conjunction with the accompanying drawings although variations and modifications may be effective without departing from the spirit and scope of the novel concepts of the disclosure and in which:

FIG. 1 is a plan view of the face of the instrument,

FIG. 2 is a sectional view illustrating the various portions of the invention, and FIG. 3 is a detailed sectional view of the rim portion of the aircraft illustrating certain of the indicia.

DESCRIPTION OF THE PREFERRED EMBODIMENTS

The figures illustrate an aircraft instrument designated generally as 10 which includes a case having side walls 11 and an end 12. A front rim of the instrument 13 is formed with a ledge 20 in which a glass cover 14 is mounted and held in place by a ring 17. As best shown in FIGS. 2 and 3 a guide ring 19 bears against the ring 17 and the guide ring 19 and ring 17 are attached to the instrument housing 13 with screws 18. A compass rose 16 is mounted by screws 15 to the instrument adjacent the rim 13 and is visible from the front of the instrument as illustrated in FIG. 1. An aircraft indicia 41 is rotatably mounted on the instrument above the compass rose 16 and is supported on a shaft 42 which is rotatably mounted in a suitable bearing 43 on the back of the case 12. The shaft 42 carries a gear 44 which mates with a gear 46 that is driven by a shaft 48 mounted in a suitable bearing 47 attached to the case of the instrument and the shaft 48 is driven by a compass servo 49 which receives an input signal from a compass 51.

A first radio indicia 52 is supported by a sleeve 53 that surrounds the shaft 42 and the sleeve 53 is attached to a gear 56 that meshes with a gear 57 mounted on a shaft 58 driven by a first radio receiver servo 59 that is driven from a first receiver 61. The indicia 52 has a first end 55 which represents the radio station to which the receiver 61 is turned and the other end 54 of the indicia 52 represents the direction from the station to the aircraft.

A second radio station indicia 62 is mounted for rotational movement relative to the instrument 10 and crosses the center of the instrument at aircraft 41. The indicia 62 has a first end 63 which represents the position of the station relative to the aircraft and a second end 64 which represents the direction away from the station to the aircraft. The indicia 62 is supported on a sleeve 66 as shown in FIG. 2 and carries a gear 67 which meshes with a gear 68 that is supported on a shaft 69 from a radio receiver servo 71. The servo 71 is mounted by a support 72 to the case 11 of the instrument and is driven by a receiver 73.

A pair of manually movable reference indicia 36 and 37 are mounted for slidable movement relative to the compass rose 16 about the periphery thereof as shown in detail in FIG. 3. Only the details of one of the movable indicia 36 and 37 is illustrated since they both have the same construction. A ring member 19 is attached to the glass holding ring 17 and to the instrument by screws 18. The ring 19 is formed with a pair of depressions 21 and 22 and the member 36 is received in the groove 21 and has an L-shaped portion 31 that is slidably mounted in the groove 21 so that it can move around the periphery of the compass rose. A hinged pointer portion 33 is mounted by hinge pin 32 to the portion 31 such that in the event it is desired to pivot the point 33 upwardly so that it is not visible this can be done by hand. The second movable pointer 37 moves in the same manner in the groove 21 as the pointer 36 and its description will not be repeated.

A wind direction and velocity indicator 25 is movable about the compass rose 16 and has a portion 23 that is mounted in the groove 22 of member 19. A top portion 24 carries a hinged portion 27 which is mounted to the portion 27 by hinge pin 26 such that the wind indicia can be pivoted upwardly about the pin 26 when desired.

A knob 28 with suitable wind velocity indicia mounted thereon is rotatably connected to the portion 27 such that the velocity of the wind can be set with the knob 28 to indicate the wind as known by the user of the instrument.

In operation the receivers 61 and 63 are tuned to known VOR stations and the indicias 52 and 62 will be driven through the linkage shown to indicate the direction to and from the stations. The manually movable reference points 36 and 37 can be set to desired references. For example the pilot may set one of the indicias 36 or 37 to a radio he wishes to track. By turning the nose of the airplane he "leads" the desired stationary around to the reference point. He will then be on the desired radio and this can be accomplished on either flying inbound or outbound from the radio station. Also a check point adhead of the airplane or a point at which a turn to an inbound leg on a holding pattern may be set by the indicias 36 and 37. The wind indicia 25 is also set to the wind which is known by the pilot.

It is to be realized that the indicator will be mounted on the instrument panel of the aircraft and can be continuously observed by the pilot and that it shows a plan position of the aircraft relative to the ground and the radio stations and thus can be used as a map so that the pilot can continuously observe his position.

Although the invention has been described with respect to preferred embodiments it is not to be so limited as changes and modifications may be made therein which are within the full intended scope of the invention as defined by the appended claims.

I claim as my invention:

1. A navigation instrument comprising a fixed compass rose; one more more VOR radio station symbols mounted rotatably around the perimeter of said compass rose with each such station symbol having a line corresponding to a radial from such station symbol that would correspond with a map showing and extending across the face of the instrument through the center and to the perimeter of said compass rose opposite the station symbol, each such symbol being slaved to a radio receiver and rotatable automatically by the radio mechanism to the point on the compass rose indicating the direction to the station; an airplane symbol rotatably mounted in the center of the face of said instrument and connected to a compass mechanism so that the direction of the aircraft is indicated by the nose of the symbol pointing to that direction on the compass rose.

2. An aircraft navigation instrument comprising a housing, a fixed compass rose mounted in said housing such that it is visible, an aircraft indicia mounted at the center of said compass rose and rotatable relative thereto, a compass means coupled to said aircraft indicia to drive it, a first radio indicia rotatably mounted to rotate relative to the center of the compass rose to indicate the direction to and from a first VOR radio station and said aircraft as shwown on a map, a first VOR radio receiver connected to drive said first radio indicia, including a second radio indicia rotatably mounted to rotate relative to the center of the compass rose to indicate the direction to and from a second VOR radio station and said aircraft as shown on a map, and a second VOR radio receiver connected to drive said second radio indicia.

3. An aircraft navigation instrument according to claim 2 including a wind indicia movable about said compass rose to indicate wind direction.

4. An aircraft navigation instrument according to claim 3 including means associated with said wind indicia to indicate wind velocity.

5. An aircraft navigation instrument according to claim 2 including a first reference indicia movable relative to said compass rose.

6. An aircraft navigation instrument according to claim 5 wherein said first reference indicia can be moved to an inoperable position.

7. An aircraft navigation instrument according to claim 5 including a second reference indicia movable relative to said compass rose.

8. An aircraft navigation instrument comprising a housing, a fixed compass rose mounted in said housing such that it is visible, an aircraft indicia mounted at the center of said compass rose and rotatable relative thereto, a compass means coupled to said aircraft indicia to drive it, a first radio indicia rotatably mounted to rotate relative to the center of the compass rose to indicate the direction to and from a first radio station and said aircraft, a first radio receiver connected to drive said first radio indicia, including a second radio indicia rotatably mounted to rotate relative to the center of the compass rose to indicate the direction to and from a second radio station and said aircraft, a second radio receiver connected to drive said second radio indica, including a wind indicia movable about said compass rose to indicate wind direction, and wherein said wind indicia is pivotally mounted so it can be moved to an inoperative position.

9. An aircraft navigation instrument according to claim 8 including a first reference indicia movable relative to said compass rose.

10. An aircraft navigation instrument according to claim 8 wherein said first reference indicia can be moved to an inoperable position.

11. An aircraft navigation instrument according to claim 8 including a second reference indicia movable relative to said compass rose.

* * * * *